United States Patent
Saito

(10) Patent No.: US 6,676,567 B2
(45) Date of Patent: Jan. 13, 2004

(54) SPEED CHANGE COMPLETION DEGREE ESTIMATING SYSTEM OF AUTOMATIC TRANSMISSION AND SPEED CHANGE CONTROL DEVICE USING SAME

(75) Inventor: Yuji Saito, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/953,972

(22) Filed: Sep. 18, 2001

(65) Prior Publication Data

US 2002/0034997 A1 Mar. 21, 2002

(30) Foreign Application Priority Data

Sep. 18, 2000 (JP) .......................................... 2000-282337

(51) Int. Cl.$^7$ .............................................. F16H 61/04
(52) U.S. Cl. ........................... 477/143; 477/117; 701/64
(58) Field of Search ................................. 477/143, 116, 477/117; 701/64

(56) References Cited

U.S. PATENT DOCUMENTS

| | | | | |
|---|---|---|---|---|
| 4,793,216 A | * | 12/1988 | Hiramatsu et al. | 477/148 |
| 4,868,753 A | * | 9/1989 | Mori | 701/66 |
| 4,955,256 A | * | 9/1990 | Kashihara et al. | 701/64 |
| 5,291,979 A | * | 3/1994 | Iizuka | 477/65 |
| 5,445,577 A | * | 8/1995 | Fujita et al. | 477/120 |
| 5,496,227 A | * | 3/1996 | Minowa et al. | 477/110 |
| 5,984,834 A | * | 11/1999 | Miyamoto et al. | 477/148 |
| 6,014,604 A | * | 1/2000 | Kuroiwa et al. | 701/64 |
| 6,128,565 A | * | 10/2000 | Tsutsui et al. | 701/51 |
| 6,577,939 B1 | * | 6/2003 | Keyse et al. | 477/34 |

FOREIGN PATENT DOCUMENTS

| | | |
|---|---|---|
| JP | 4-366063 | 12/1992 |
| JP | 6-109130 | 4/1994 |

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Saito, filed Sep. 18, 2001.
U.S. patent application Ser. No. 09/953,937, Saito, filed Sep. 18, 2001.
U.S. patent application Ser. No. 09/953,966, Kato, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/954,017, Murasugi et al., filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

*Primary Examiner*—Charles A Marmor
*Assistant Examiner*—Dennis Abdelnour
(74) *Attorney, Agent, or Firm*—Foley & Lardner

(57) ABSTRACT

An automatic transmission is driven by an engine through a torque converter. The transmission includes a plurality of friction elements which are selectively engaged to provide a selected gear thereby to transmit the power of engine to an output shaft of the transmission while changing the rotation speed. A speed change completion degree estimating system is provided, which comprises a first section that derives a difference (Nt−Ne) between an input rotation speed (Nt) of the transmission and an engine rotation speed (Ne); a second section that derives a difference (g×No−Ne) between the input rotation speed (g×No) of the transmission provided after completion of the speed change operation and the engine rotation speed (Ne); and a third section that calculates a speed change completion degree (Shift) of the transmission by using a ratio between the (Nt−Ne) and the (g×No−Ne).

8 Claims, 9 Drawing Sheets

FIG.2

TABLE-1

|   | R/C | H/C | L/C | LR/B | L/OWC | 2-4/B |
|---|---|---|---|---|---|---|
| 1st |   |   | ◯ | (◯) | ◯ |   |
| 2nd |   |   | ◯ |   |   | ◯ |
| 3rd |   | ◯ | ◯ |   |   |   |
| 4th |   | ◯ |   |   |   | ◯ |
| Rev | ◯ |   |   | ◯ |   |   |

FIG.4
VEHICLE AT STAND STILL (No=0)
Ne: ENGINE SPEED
Nt: TURBINE SPEED
No: OUTPUT ROTATION SPEED OF TRANSMISSION
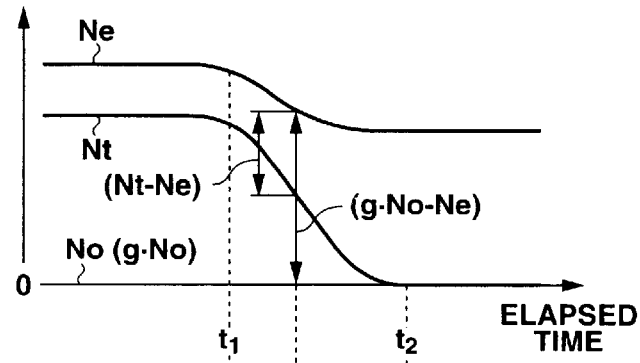
SHIFT: SPEED CHANGE COMPLETION DEGREE
$$\text{SHIFT} = \frac{(Nt-Ne)}{(g \cdot No-Ne)} \times 100 \, (\%)$$
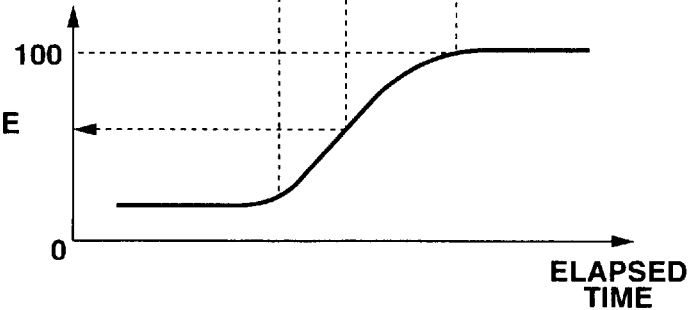

FIG.5
VEHICLE UNDER RUNNING (No > 0)
Ne: ENGINE SPEED
Nt: TURBINE SPEED
No: OUTPUT ROTATION SPEED OF TRANSMISSION
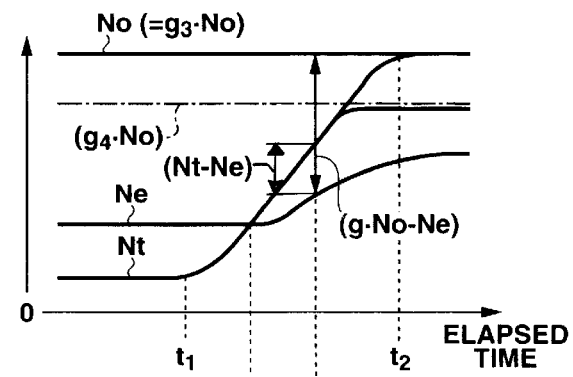
SHIFT: SPEED CHANGE COMPLETION DEGREE
$$\text{SHIFT} = \frac{(Nt-Ne)}{(g \cdot No-Ne)} \times 100 \,(\%)$$
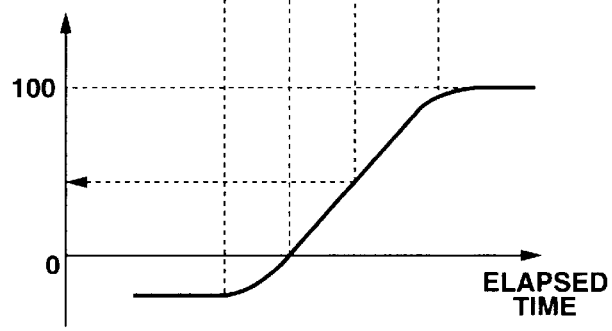

HYDRAULIC PRESSURE FOR FRICTION ELEMENT
(Po: COMMAND VALUE
Pc: ACTUAL PRESSURE)

Ne: ENGINE SPEED
Nt: TURBINE SPEED
No: TRANSMISSION OUTPUT ROTATION SPEED

HYDRAULIC PRESSURE FOR FRICTION ELEMENT
(Po: COMMAND VALUE
Pc: ACTUAL PRESSURE)

Ne: ENGINE SPEED
Nt: TURBINE SPEED
No: TRANSMISSION OUTPUT ROTATION SPEED

SPEED CHANGE COMPLETION DEGREE ESTIMATING SYSTEM OF AUTOMATIC TRANSMISSION AND SPEED CHANGE CONTROL DEVICE USING SAME

BACKGROUND OF THE INVENTION

1. Field of the Invention

The present invention relates in general to control devices for controlling automotive automatic transmissions, and more particularly to control devices of a type that includes a so-called speed change completion degree estimating system that estimates the speed change compression degree assumed by the transmission, particularly estimates, upon selection of a drive range from a non-drive range, the time (or timing) when a friction element needed for the drive range starts its actual engaging operation following completion of piston stroke thereof.

2. Description of Related Art

In an automotive automatic transmission, there are installed a plurality of friction elements, such as clutches and brakes, and a hydraulic actuating means for selectively actuating the friction elements. That is, by actuating the friction elements that are selected, a certain power transmission path is provided to establish a desired gear, and by switching the friction elements that are to be actuated, another power transmission path is provided to establish another gear while carrying out a speed change of the transmission.

The transmission is powered by an engine through a torque converter. That is, the torque inputted to the transmission is outputted therefrom while being subjected to a speed change according to a selected gear.

One of the speed change completion degree estimating systems is described in Japanese Patent First Provisional Publication 6-109130. The system is constructed to estimate, upon selection of a drive range from a non-drive range, the time (or timing) when a friction element needed for the drive range starts its actual engaging operation following completion of piston stroke thereof, by detecting a speed drop from the torque converter to the transmission. That is, before starting of the engaging operation of the friction element, the hydraulic pressure for the element is so controlled as to obtain an optimum piston stroke, and after starting of the engaging operation, the hydraulic pressure is so controlled as to obtain an optimum speed change. That is, the completion of the piston stroke, namely, the timing of starting the actual engaging operation of the friction element is estimated by the drop of rotation speed of input means of the transmission.

Japanese Patent First Provisional Publication 4-366063 describes another system that estimates completion of the piston stroke, namely, the time of starting the actual engaging operation of a friction element. In this system, when, upon selection of a drive range from a non-drive range, a speed ratio between input and output speeds of a torque converter is reduced to indicate a value corresponding a drop of an input means of the transmission, estimation is so made that the friction element has finished the piston stroke, namely, started its actual engaging operation.

SUMMARY OF THE INVENTION

In the above-mentioned known systems, the estimation for completion of the piston stroke is based on the assumption that when, under standstill of an associated motor vehicle, the rotation speed of an output shaft of the transmission is 0 (zero) and when, due to engagement of the friction element, the input and output shafts of the transmission are engaged, the rotation speed of the input shaft is 0 (zero), and even under this condition, the engine is able to keep its operation due to a slip effect of the torque converter.

Accordingly, the above-mentioned systems have the following weak points due to their constructional inherence.

That is, if, during running of a vehicle (viz., transmission output shaft speed>0), the driver moves the shift lever from D-range to N-range by mistake and then noticing the mistake, he or she returns the shift lever back to D-range, there is such a possibility that the rotation speed of the turbine of the torque converter (viz., transmission input shaft speed) increases with progress of the speed change in the transmission. In this case, the estimation to completion of the piston stroke of the friction element (namely, the timing of starting the actual engaging operation of the element) is not achieved.

The above matters will be clearly understood from the following explanation which is made with the aid of FIGS. 7 to 10.

That is, as is shown in FIG. 7, when, at time "t1", the driver moves the shift lever back to D-range from N-range upon noticing the miss-shifting, a command value "Po" of hydraulic pressure of the friction element is set to instantly increase the pressure to a relatively high level for instantly completing the piston stroke as shown. However, actually, the hydraulic pressure "Pc" fed to the friction element is forced to increase with a certain time lug, as is indicated by a solid curve.

However, during running of the vehicle, it sometimes occurs that with starting of actual engaging operation of the friction element at time "t2", the turbine rotation speed "Nt" (viz., transmission input shaft speed) is increased as shown in FIG. 7 irrespective of the engine rotation speed "Ne". In this case, detection of the time "t2" when the piston stroke of the friction element is completed (viz., the actual engaging operation starts) is not achieved by the above-mentioned known estimation system because the system is constructed to use the drop of the turbine rotation speed "Nt" as a sign of that completion.

Thus, in reality, upon sensing such sign, it becomes necessary to set the command value "Po" to assume the character as shown by the alternate long and two short dashes line in order that, after the time "t2", the turbine rotation speed "Nt" is smoothly increased to the level "No" of transmission output shaft speed. (In the illustrated example, explanation is based on third gear having a gear ratio of 1:1, and thus, the level is equal to the transmission output shaft speed "No"). Thus, it is necessary to control the actual hydraulic pressure "Pc" in a manner as is indicated by the alternate long and short dash line.

However, actually, due to the above-mentioned reasons, even after the time "t2", the command value "Po" is kept high that is set for controlling the piston stroke.

Accordingly, in the above-mentioned known system, the actual hydraulic pressure "Pc" is forced to increase rapidly toward and finally to the level of the higher command value "Po", as is indicated by the solid line, so that after the time "t2", the turbine rotation speed "Nt" is rapidly increased to the transmission output shaft speed irrespective of a desired speed acceleration gradient, inducing a possibility of a marked select shock.

Furthermore, as is shown in FIG. 8, after the time "t2" when the actual engaging operation of the friction element starts following completion of the piston stroke effected by the actual hydraulic pressure "Pc" that is increased to follow the command value "Po" of hydraulic pressure due to the shift back of the shift lever from N-range to D-range at the time "t1", it becomes necessary to increase the command value "Po" of hydraulic pressure in such manner as is indicated by the alternate long and short dash line for the purpose of smoothly effecting the change gear. However, in the known system, for the abovementioned reasons, the timing, viz., the time "t2", of starting the actual engaging operation of the friction element can not be detected because the shifting from N-range to D-range is made under running of the associated vehicle. Thus, in the known system, even after the time "t2", the command value "Po" of hydraulic pressure for the friction element is kept at the value for controlling the piston stroke as is indicated by the solid line, and thus, the actual hydraulic pressure "Pc" is settled to the kept value of the command value "Po" without increasing.

Accordingly, in reality, after the time "t2", with progress of the gear changing operation, it becomes necessary to smoothly bring the turbine rotation speed "Nt" to the transmission output shaft speed as is indicated by the alternate long and short dash line. In the illustrated example, the gear ratio is 1:1 because of taking the third gear, and thus, the turbine rotation speed "Nt" is equal to the transmission output shaft speed. However, actually, due to the abovementioned reasons, as is indicated by the solid line, the turbine rotation speed "Nt" fails to reach the transmission output shaft speed (viz., "No"), and thus, an actual speed change progress is stopped and thus subsequent control for the hydraulic pressure is suppressed.

In order to eliminate the weak points possessed by the above-mentioned known systems, the following measures may be thought out, which will be described with reference to flowcharts of FIGS. 9 and 10. As will become apparent hereinafter, in such measures, estimation for completion of the piston stoke is carried out in respective cases.

That is, in step S31 of the flowchart of FIG. 9, the variation direction of the turbine rotation speed "Nt" is derived, in such a manner as is depicted in the flowchart of FIG. 10.

In FIG. 10, at step S41, a current turbine rotation speed "Nt1" is read, and at step S42, a turbine rotation speed "Nt2" after gear change is calculated from the following equation:

*Nt*2=(gear ratio set after gear change)×(transmission output shaft speed "No")  (1)

At step S43, judgement is carried out as to whether "Nt1" is greater than "Nt2" or not. If YES, the operation flow goes to step S44 where it is judged that the turbine rotation speed "Nt" has lowered. While, if NO, the operation flow goes to step S45 where it is judged that the turbine rotation speed "Nt" has increased. The result of the step S44 or S45 goes to step S32 of the flowchart of FIG. 9.

In the flowchart of FIG. 9, if it is judged that the turbine rotation speed "Nt" has lowered, the operation flow goes to steps S33 and S34 and judges the completion of the piston stroke (viz., starting of actual engaging operation) if the turbine rotation speed "Nt" is lower than a predetermined level. While, if it is judged that the turbine rotation speed "Nt" has increased, the operation flow goes to steps S35 and S36 and judges the completion of the piston stroke (viz., starting of actual engaging operation) if the turbine rotation speed "Nt" is greater than a predetermined level.

However, the applicant notes that the above-mentioned measures are not practical because of complicated steps for estimating completion of the piston stroke.

Accordingly, an object of the present invention is to provide a speed change completion degree estimating system of an automatic transmission, which can easily estimate the speed change completion degree in every gear changes of the transmission.

Another object of the present invention is to provide a speed change control device of an automatic transmission, which controls operation of a friction element of the transmission based on information provided by the speed change completion degree estimating system.

According to a first aspect of the present invention, there is provided a speed change completion degree estimating system for use in an automatic transmission driven by an engine through a torque converter, the transmission including a plurality of friction elements which are selectively engaged to provide a selected gear thereby to transmit the power of engine to an output shaft of the transmission while changing the rotation speed. The system comprises a first section that derives a difference (Nt−Ne) between an input rotation speed (Nt) of the transmission and an engine rotation speed (Ne); a second section that derives a difference (g×No−Ne) between the input rotation speed (g×No) of the transmission provided after completion of the speed change operation and the engine rotation speed (Ne); and a third section that calculates a speed change completion degree (Shift) of the transmission by using a ratio between the (Nt−Ne) and the (g×No−Ne).

According to a second aspect of the present invention, there is provided a method for estimating a speed change completion degree of an automatic transmission which is driven by an engine through a torque converter, the transmission including a plurality of friction elements which are selectively engaged to provide a selected gear thereby to transmit the power of engine to an output shaft of the transmission while changing the rotation speed. The method comprises deriving a difference (Nt−Ne) between an input rotation speed (Nt) of the transmission and an engine rotation speed (Ne); deriving a difference (g×No−Ne) between the input rotation speed (g×No) of the transmission provided after completion of the speed change operation and the engine rotation speed (Ne); and calculating a speed change completion degree (Shift) of the transmission by using a ratio between the (Nt−Ne) and the (g×No−Ne).

According to a third aspect of the present invention, there is provided a speed change control device of an automatic transmission which is driven by an engine through a torque converter, the transmission including a plurality of friction elements which are selectively engaged to provide a selected gear thereby to transmit the power of the engine to an output shaft of the transmission while changing the rotation speed. The control device comprises a first section that derives a difference (Nt−Ne) between an input rotation speed (Nt) of the transmission and an engine rotation speed (Ne); a second section that derives a difference (g×No−Ne) between the input rotation speed (g×No) of the transmission provided after completion of the speed change operation and the engine rotation speed (Ne); a third section that calculates a speed change completion degree (Shift) of the transmission by using a ratio between the (Nt−Ne) and the (g×No−Ne); a fourth section that, upon shifting of a shift lever of the transmission from a non-drive range to a drive range, estimates a time when an actual engaging operation of selected one of the friction elements starts, with reference to the speed change completion degree (Shift); and a fifth section that, before the time, controls a hydraulic pressure of the selected friction element to carry out the engaging operation thereof in a first given manner and after the time, controls the hydraulic pressure to carry out the engaging operation thereof in a second given manner.

According to a fourth embodiment of the present invention, there is provided a method for controlling an automatic transmission which is driven by an engine through a torque converter, the transmission including a plurality of friction elements which are selectively engaged to provide a selected gear thereby to transmit the power of the engine to an output shaft of the transmission while changing the rotation speed. The method comprises deriving a difference (Nt−Ne) between an input rotation speed (Nt) of the transmission and an engine rotation speed (Ne); deriving a difference (g×No−Ne) between the input rotation speed (g×No) of the transmission provided after completion of the speed change operation and the engine rotation speed (Ne); calculating a speed change completion degree (Shift) of the transmission by using a ratio between the (Nt−Ne) and the (g×No−Ne); estimating, upon shifting of a shift lever of the transmission from a non-drive range to a drive range, a time when an actual engaging operation of selected one of the friction elements starts, with reference to the speed change completion degree (Shift); and controlling, before the time, a hydraulic pressure of the selected friction element to carry out the engaging operation thereof in a first given manner and controlling, after the time, the hydraulic pressure to carry out the engaging operation in a second given manner.

BRIEF DESCRIPTION OF THE DRAWINGS

Other objects and advantages of the present invention will become apparent from the following description when taken in conjunction with the accompanying drawings, in which:

FIG. 2 is table showing ON/OFF relation between selected gears and friction elements of the automatic transmission;

FIG. 4 is a time chart showing time series variations of various factors and a speed change completion degree "Shift" in a case wherein, with an associated motor vehicle being at a standstill, the shift lever is moved from N-range to D-range;

FIG. 5 is a time chart similar to FIG. 4, but showing a case wherein the motor vehicle is running;

DETAILED DESCRIPTION OF THE INVENTION

In the following, the present invention will be described in detail with reference to the accompanying drawings.

Figure 1:
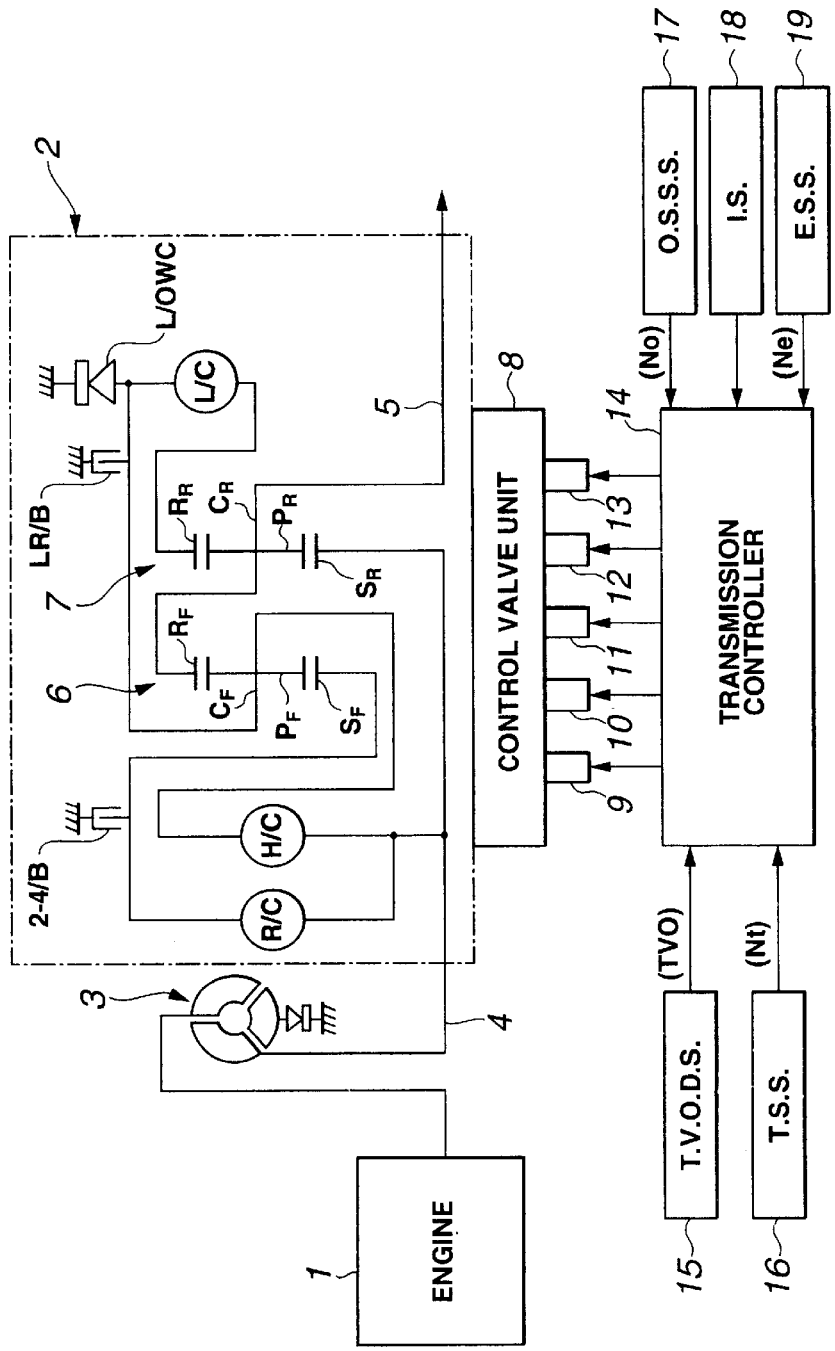
FIG. 1 is a schematic block diagram of an automotive automatic transmission to which the present invention is practically applied.

Referring to FIG. 1, there is schematically shown an automatic transmission to which the present invention is practically applied. As will become clear as the description proceeds, in accordance with the present invention, there are provided a speed change completion degree estimating system and a speed change control device that practically uses the estimating system.

In FIG. 1, denoted by numeral 1 is an engine, such as an internal combustion engine or the like, and denoted by numeral 2 is an automatic transmission.

In accordance with a depression degree of an accelerator pedal (not shown) actuated by a driver, the output of the engine 1 is controlled. More specifically, in response to the movement of the accelerator pedal, a throttle valve (not shown) of the engine pivots between a full-closed position and a full-open position to control the engine output.

The output of the engine 1 is transmitted to the automatic transmission 2 through a torque converter 3, as shown.

The automatic transmission 2 generally comprises input and output shafts 4 and 5 which are aligned and front and rear planetary gear units 6 and 7 which are coaxially disposed on and about the input and output shafts 4 and 5.

The front planetary gear unit 6 comprises a front sun gear $S_F$, a front ring gear $R_F$, front pinions $P_F$ operatively disposed between the front sun gear $S_F$ and the front ring gear $R_F$, and a front carrier $C_F$ rotatably holding the front pinions $P_F$.

The ring planetary gear unit 7 comprises a rear sun gear $S_R$, a rear ring Gear $R_R$, rear pinions $P_R$ operatively disposed between the rear sun gear $S_R$ and the rear ring gear $R_R$, and a rear carrier $C_R$ rotatably holding the rear pinions $P_R$.

For deciding a transmission path (viz., selected gear) of the planetary gear units 6 and 7, there are employed several friction elements which are a low clutch L/C, a second/fourth speed brake 2–4/B, a high clutch H/C, a low reverse brake LR/B, a low one-way clutch L/OWC and a reverse clutch R/C. These friction elements are associated with one another in the following manner.

That is, the front sun gear $S_F$ is engaged with the input shaft 4 when the reverse clutch R/C assumes an engage position, and is fixed to a case of the transmission when the second/fourth speed brake 2–4/B assumes an engage position.

The front carrier $C_F$ is engaged with the input shaft 4 when the high clutch H/C assumes an engage position.

Due to function of the low one-way clutch L/OWC, the front carrier $C_F$ can be suppressed from rotation in a direction reverse to that of the engine 1. Furthermore, due to function of the low reverse brake LR/B, the front carrier $C_F$ is fixable to the transmission case.

The front carrier $C_F$ and the rear ring gear $R_R$ are selectively engageable with each other by the low clutch L/C.

The front ring gear $R_F$ and the rear carrier $C_R$ are constantly engaged and these friction elements $R_F$ and $C_R$ are fixed to the output shaft 5 to rotate therewith.

As is seen from Table-1 of FIG. 2, various gear positions (viz., first, second, third and fourth gears and reverse gear) of the transmission are obtained by selectively operating the friction elements R/C, H/C, L/C, LR/B, L/OWC and 2–4/B. In the table, engage condition is indicated by a solid line circle. In case of the low one-way clutch L/OWC, the solid line circle indicates a self-engagement condition. The engage condition of the low reverse brake LR/B assumed when engaging braking is needed is indicated by a dotted line circle.

For controlling the friction elements L/C, 2–4/B, H/C, LR/B and R/C, there is employed a control valve unit 8 (see FIG. 1). This control valve unit 8 is incorporated with a manual valve (not shown), a line pressure solenoid 9, a low clutch solenoid 10, a second/fourth speed brake solenoid 11, a high clutch solenoid 12 and a low reverse brake solenoid 13.

Due to ON/OFF operation of the line pressure solenoid 9, the line pressure is controlled in magnitude. In accordance with movement of a shift lever actuated by a driver, the manual valve (not shown) is moved to a forward drive range (D), a reverse range (R) or a parking/neutral range (P, N).

When the manual valve is in the forward drive range (D), duty control is made to the low clutch solenoid 10, the second/fourth speed brake 2–4/B, the high clutch H/C and the low reverse brake LR/B to control the hydraulic pressures fed to the corresponding friction elements L/C, 2–4/B, H/C and LR/B respectively, by feeding the line pressure to selected hydraulic circuits. With this, the first, second, third and fourth gears "1st", "2nd", "3rd" and "4th" as shown in Table-2 (see FIG. 2) are selectively obtained.

When the manual valve is in the reverse range (R), the line pressure is directly fed to the reverse clutch R/C to engage the same, and at the same time, due to the duty control applied to the low reverse brake solenoid 13, the hydraulic pressure led to the low reverse brake LR/B is subjected to a time series control to engage the same. With this, the reverse gear "Rev" as shown in Table-2 (see FIG. 2), is obtained.

When the manual valve in the parking/neutral range (P, N), the line pressure is not fed to any of the hydraulic circuits, so that all of the friction elements are kept disengaged. With this, the transmission assumes a neutral condition.

Referring back to FIG. 1, the ON/OFF control of the line pressure solenoid 9 and duty control of the low clutch solenoid 10, the second/fourth speed brake solenoid 11, the high clutch solenoid 12 and the low reverse brake solenoid 13 are carried out by a transmission controller 14. The transmission controller 14 has therein a microprocessor which comprises a CPU (central processing unit), a RAM (random access memory), a ROM (read only memory) and input and output interfaces.

For such control, various information signals are led to the transmission controller 14, which are a signal (viz., signal representing an open degree "TVO" of a throttle valve) from a throttle valve open degree sensor 15, a signal (viz., signal representing a turbine speed "Nt" of a torque converter 3) from a turbine speed sensor 16, a signal (viz., signal representing a rotation speed "No" of a transmission output shaft 5) from an output shaft speed sensor 17, a signal (viz., signal representing a selected range) from an inhibitor switch 18 and a signal (viz., signal representing engine speed "Ne") from an engine speed sensor 19.

In the following, an automatic transmission operation in case of D-range will be described.

Following a control program and based on the throttle open degree signal "TVO" and the transmission output shaft speed signal "No" with respect to a predetermined gear change map, programmed operation steps are carried out in the transmission controller 14 to derive a target gear (first, second, third or fourth gear) needed in an existing condition of an associated motor vehicle.

Then, in the controller 14, a judgement is carried out as to whether the existing gear agrees with the derived appropriate gear or not. If NO, that is, when the existing gear does not agree with the target gear, a speed change command is issued for matching the existing gear with the target gear. That is, based on the information given by Table-2 (see FIG. 2), the solenoids 10 to 13 are subjected to a duty control respectively thereby to allow the friction elements to carry out their engage/disengage operations. With this, the first, second, third or fourth gear is actually and automatically established.

In the following, with aid of the flowchart of FIG. 3, a speed change completion degree estimating process according to the present invention will be described with respect to a gear change from N-range to D-range, that is, with respect to a case wherein the low clutch L/C starts its actual engaging operation following completion of a piston stroke.

At step S21, the following calculation is carried out to derive a speed change completion degree "Shift":

$$\text{Shift}=(Nt-Ne)/(g \times No-Ne) \quad (2)$$

wherein:
Nt: turbine rotation speed,
Ne: engine rotation speed,
No: transmission output shaft speed,
g: gear ratio upon completion of gear change.

In the following, the basis for using the "Shift" as the speed change completion degree will be described with reference to the time charts of FIGS. 4 and 5.

In FIG. 4, there are shown two time series variations, one (viz., upper one) showing the actual rotation speeds "Ne", "Nt" and "No" with respect to elapsed time, and the other (viz., lower one) showing the "Shift" with respect to the elapsed time. That is, at the time when the transmission output shaft speed "No" is 0 (zero), the shift lever of a vehicle under standstill is moved from N-range to D-range. At a time "t1", a friction element (viz., low clutch L/C) completes its piston stroke, and at a time "t2", the friction element (viz., low clutch L/C) completes the speed change, that is, the drive and driven parts of the low clutch show a relative rotation of 0 (zero).

In FIG. 5, there are shown two time series variations similar to those of FIG. 4, but showing a case wherein the vehicle is under running (viz., transmission output shaft speed>0) at the third speed of the transmission. That is, at the time when the transmission output shaft speed is higher than 0 (zero), the shift lever of the vehicle under running at the third gear is moved from N-range to D-range. At a time "t1" after completion of the engaging operation of the high clutch H/C, the friction element (viz., low clutch L/C) completes the piston stoke, and at a time "t2", the friction element (viz., low clutch L/C) completes the speed change, that is, the drive and driven parts of the low clutch show a relative rotation of 0 (zero). As shown, in this case, the turbine speed "Nt" becomes equal to the input shaft speed of the transmission that is established when the speed change is completed. It is to be noted that since the gear ratio ($g_3$) is 1:1 in the third gear, the input shaft speed established when the speed change is completed is equal to the output shaft speed.

For ease of description, such input shaft speed will be referred to "speed change completed input speed" in the following.

It is to be noted that the alternate long and short dash line in FIG. 5 shows an operation condition at the time when the shift lever is moved from N-range to D-range under running at the fourth gear. That is, after such movement of the shift lever, the second/fourth brake 2–4/B is engaged, and thereafter, the turbine speed "Nt" is gradually converged to the "speed change completed input speed" ($g_4 \cdot No$) as the engaging operation of the high clutch H/C advances. It is to be noted that the "speed change completed input speed" ($g_4 \cdot No$) in this case is represented by multiplication of the gear ratio ($g_4$) and the output shaft speed "No" of the transmission.

As is seen from both the time charts of FIGS. 4 and 5, at the time "t1" when the friction element (viz., low clutch L/C, however, high clutch H/C in case of the fourth gear) starts its actual engaging operation following completion of the piston stroke, the speed change completion degree "Shift" starts its rising. Accordingly, the starting of rising of the degree "Shift" can be regarded as a sign of the start of the actual engaging operation of the friction element (viz., low clutch L/C, however, high clutch H/C in case of the fourth gear) that would take place after completion of the piston stroke.

Furthermore, as is seen from FIGS. 4 and 5, with advancement of the speed change operation, the speed change completion degree "Shift" increases. Accordingly, from a quantitative point of view, it can be estimated that the progress rate of the speed change operation increases with increase of the degree "Shift".

As is seen from the equation of (2), when the turbine speed "Nt" is equal to the engine speed "Ne", the degree "Shift" shows 0 (zero), and when the turbine speed "nt" is converged to the "speed change completed input speed" ($g \cdot No$), the degree "Shift" shows 1 (one, or 100%).

Although the above description is directed to the select speed change from N-range to D-range, the speed change completion degree "Shift" is applicable to other speed change. That is, the starting of rising of the degree "Shift" is regarded as a sign of the start of the actual engaging operation of a friction element following the piston stroke, and it is estimated that the progress rate of the speed change operation increases with increase of the degree "Shift".

Figure 3:
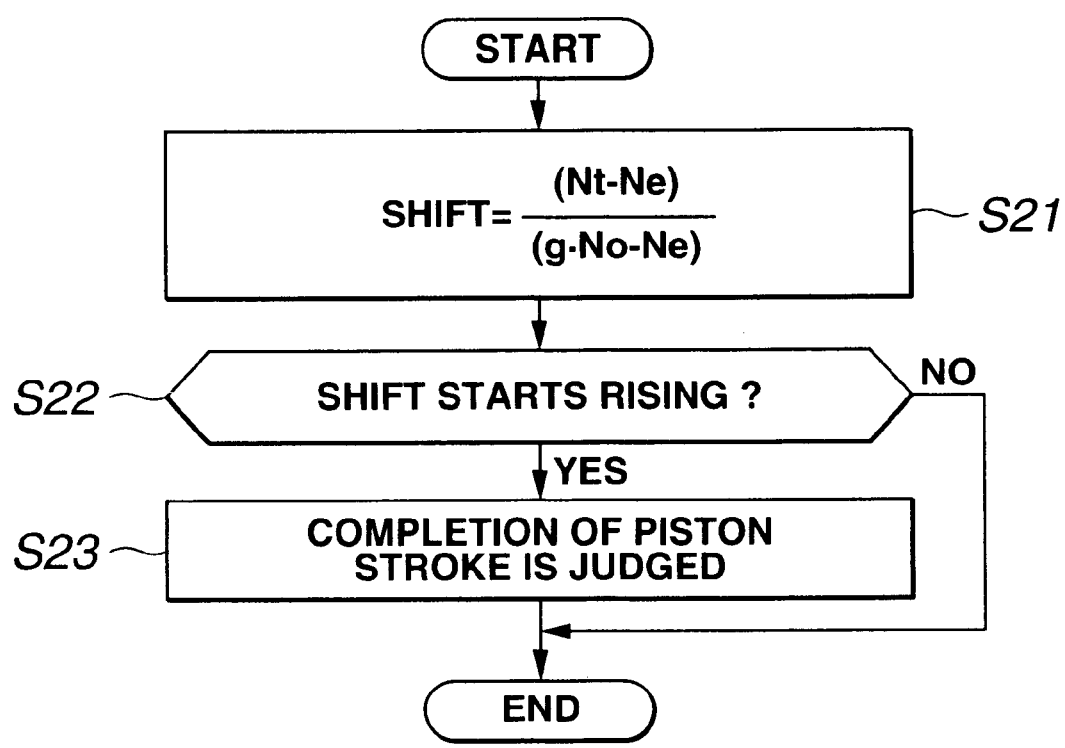
FIG. 3 is a flowchart, showing operation steps programmed for detecting or estimating completion of piston stroke of a selected friction element in case of shifting shift from N-range to D-range.

Referring back to the flowchart of FIG. 3, at step S22, judgment is carried out as to whether the speed change completion degree "Shift" starts its rising or not. If YES, that is, when the degree "Shift" shows the sign, the operation flow goes to step S23 to estimate that the friction element (viz., low clutch L/C, however, high clutch H/C in case of the fourth gear) has started the actual engaging operation following the piston stroke. However, if NO at step S22, that is, when the degree "Shift" does not show the sign, the operation flow goes to END.

Figure 9:
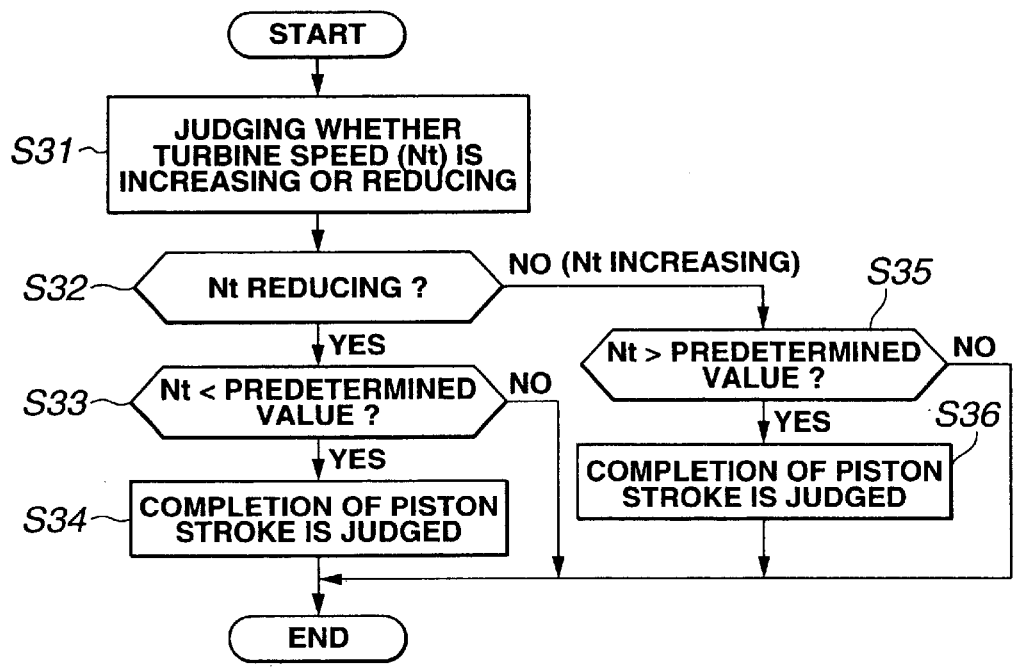
FIG. 9 is a flowchart showing operation steps programmed in the known estimating system for detecting completion of a piston stroke of a selected friction element.
Figure 10:
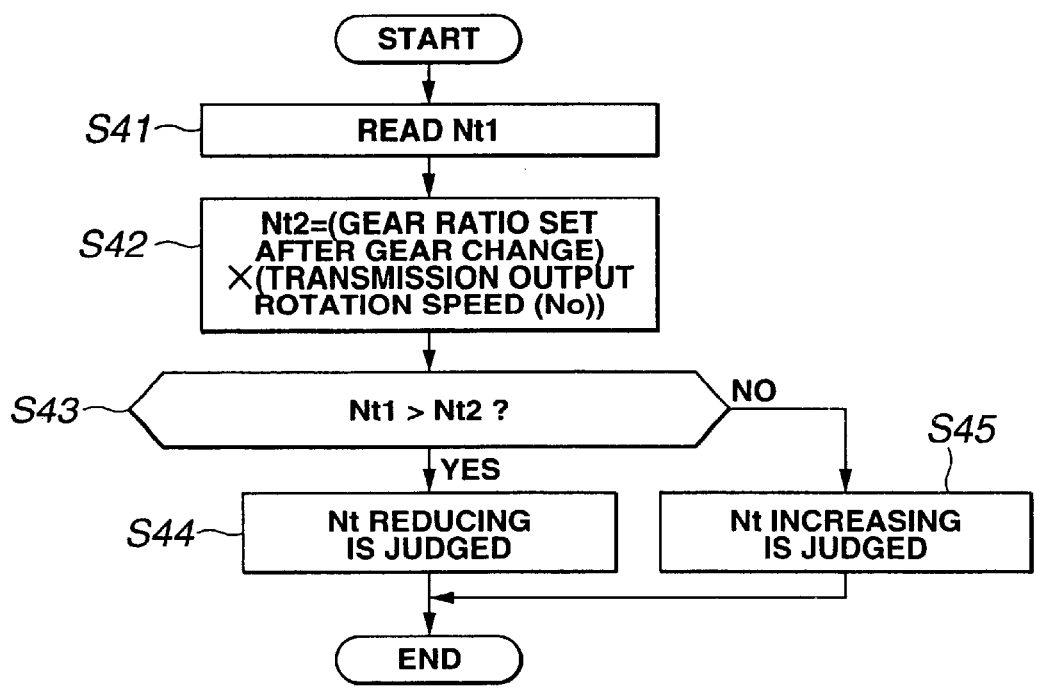
FIG. 10 is a flowchart showing operation steps programmed in the known estimating system for detecting whether a turbine speed is increasing or lowering.

As will be understood from the above description, the judgement for starting the actual engaging operation following piston stoke according to the present invention is quite simple and thus practical as compared with that used in the measures of FIGS. 9 and 10.

In the following, with aid of the time chart of FIG. 6, an actual speed change control will be described with respect to a case wherein, with a motor vehicle being standstill, the shift lever is moved from N-range to D-range.

As is seen from the time chart, within a period "$\Delta T_1$" from a time "t1" to a time "t2", the command value "Po" of the hydraulic pressure led to the friction element (viz., low clutch L/C) is increased sharply for the purpose of completing the piston stroke of the friction element as soon as possible. As shown, a high pre-charge pressure is kept in the period "$\Delta T_1$" for that purpose.

However, at the time "t2", the command value "Po" is sharply lowered to a certain value. That is, if completion of the piston stroke is carried out with such high pre-charge pressure, undesired shock is produced by the friction element (viz., low clutch L/C). As shown, from the time "t2", the command value "Po" is gradually increased at a given increasing rate that suppresses the shock.

As shown, the speed change completion degree "Shift" shows the starting of rising at a time "t3". That is, it is estimated that at the time "t3", the friction element (viz., low clutch L/C) has finished the piston stroke and started the actual engaging operation thereof. Upon detecting the sign of the time "t3", the following engagement capacity control is carried out.

As is seen from the time chart, upon detecting the sign "t3", the output torque of the transmission is gradually increased at an increasing rate that suppresses a select shock. However, for obtaining a speed change advancing speed that increases at a rate that brings about a notable deterioration of the select response, the command value "Po" of the hydraulic pressure is increased at a given increasing rate from the time "t3".

The rising of the command value "Po" is continued until a time "t4" when the speed change completion degree "Shift" shows a value that is somewhat smaller than 100%, that is, until a time just before completion of the speed change operation. From the time "t4" to a time "t5" for which a period "$\Delta T_2$" is defined, the increasing rate of the command value "Po" is reduced to almost 0 (zero) causing the output torque of the transmission to show a smoothed curve having no peak torque as shown. With this, undesired shift shock, which would occur upon completion of the speed change operation, is suppressed.

From the time "t5" to a time "t6" for which a period "$\Delta T_3$" is defined, the command value "Po" of the hydraulic pressure is rapidly increased to the highest level, that is, to the line pressure to finish the speed change operation.

In the above-mentioned speed change control, by using the operation steps shown in the flowchart of FIG. 3, estimation is made on the time "t3" (see FIG. 6) when, upon shifting from N-range to D-range, the friction element (viz., low clutch L/C) starts its actual engaging operation, and until the estimated time "t3", the command value "Po" of the hydraulic pressure led to the friction element is so controlled as to carry out the piston stroke in a given manner, and after the time "t3", the command value "Po" is so controlled as to carry out the speed change operation in another given manner. Thus, before and after the estimated time "t3", the command value "Po" of the hydraulic pressure for the friction element is differently but appropriately controlled in a desired manner.

Furthermore, as is seen from the description directed to the time charts of FIGS. 4 and 5, the estimation of the time when the friction element starts its actual engaging operation following the piston stoke is available not only in the case wherein the vehicle is standstill but also in the case wherein the vehicle is running. Accordingly, the above-mentioned advantageous speed change operation is obtained upon shifting from N-range to D-range under running of the vehicle.

Figure 6:
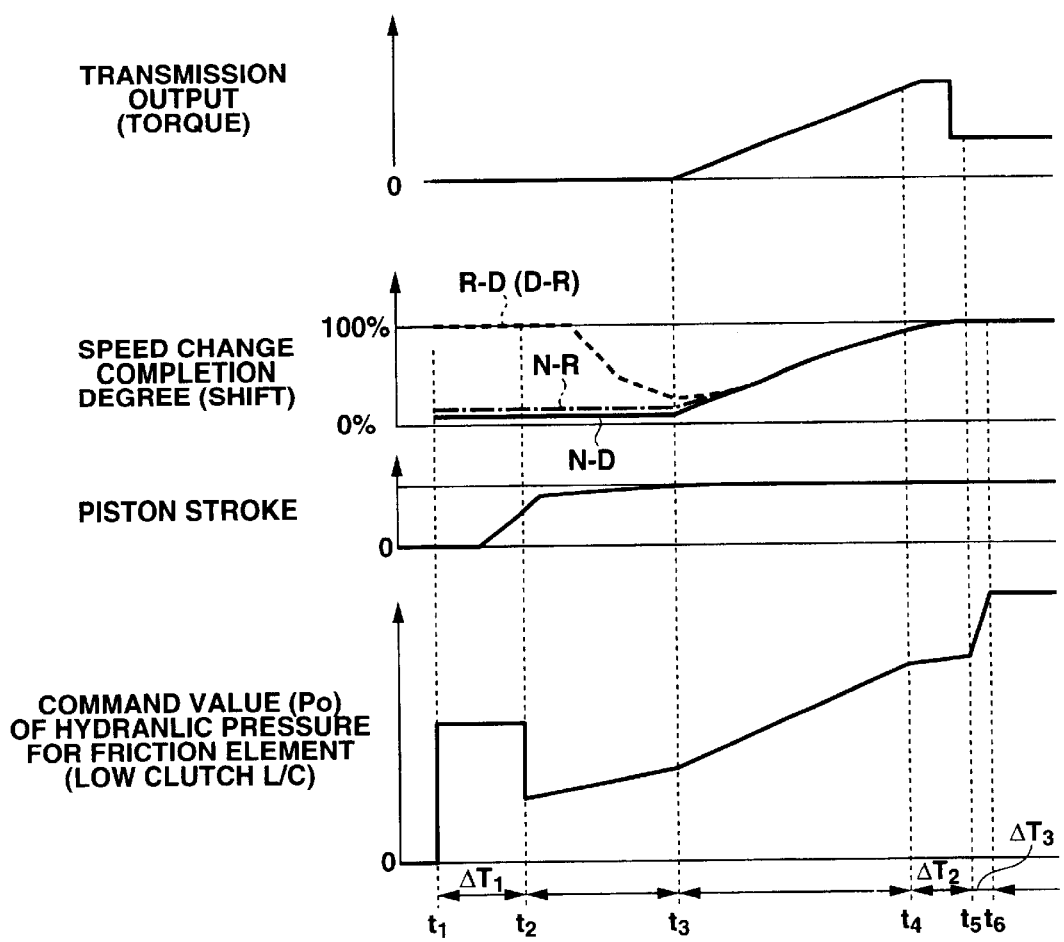
FIG. 6 is a time chart showing time series variations of various motions that are provided when a select speed change control of the invention is effected.
Figure 7:
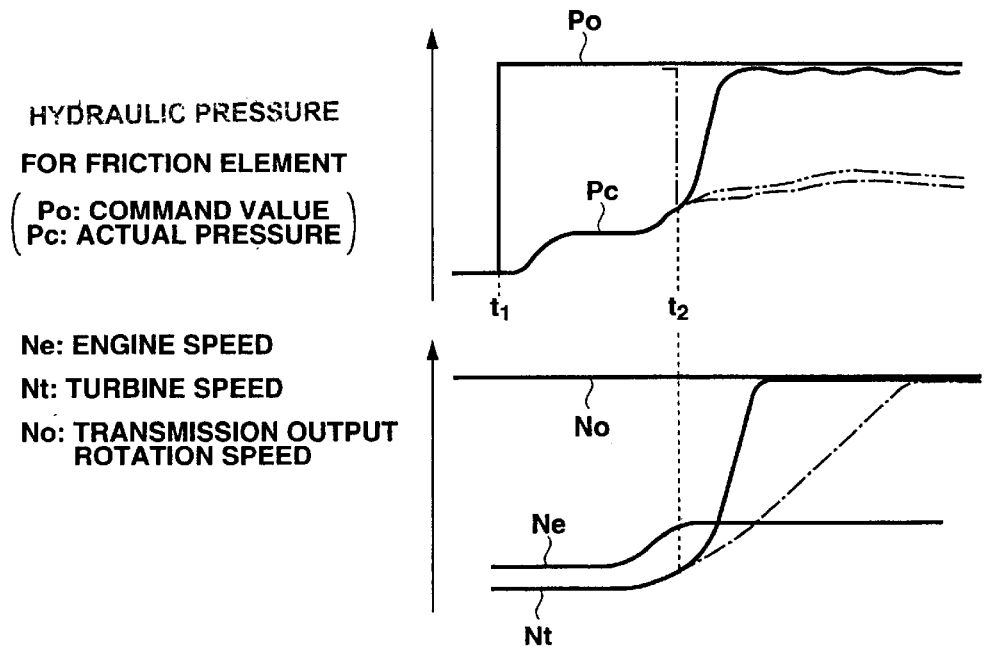
FIG. 7 is a time chart showing time series variations of various factors, that are provided by a known estimating system when, under running of a motor vehicle, the shift lever is moved from N-range to D-range.
Figure 8:
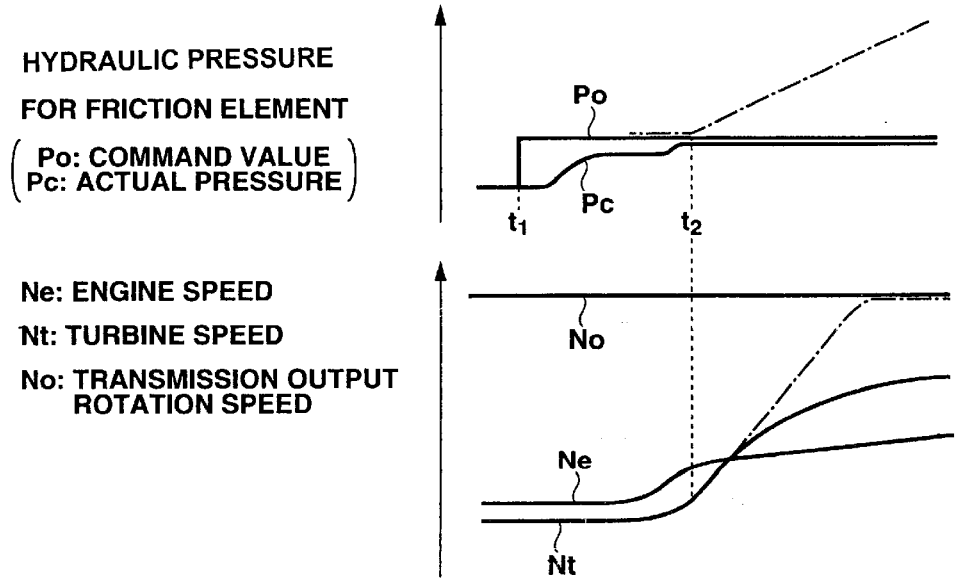
FIG. 8 is a time chart similar to FIG. 7, but showing a different condition.

Referring back to the time chart of FIG. 6, denoted by the alternate long and short dash line is a line for showing the speed change completion degree "Shift" that is effected when the shift lever is moved from N-range to R-range.

As is seen from the table of FIG. 2, upon selection of R-range from N-range, the reverse clutch R/C and the low reverse brake LR/B are brought to their engage condition to cause the transmission to assume Reverse gear. As has been described hereinabove, when the manual valve is shifted to R-range, the reverse clutch R/C is engaged by the coming line pressure and the low reverse brake LR/B is engaged by the duty control applied to the low reverse brake solenoid 13. Thus, the reverse clutch R/C is engaged first and then the low reverse brake LR/B is engaged, and upon starting of the actual engaging operation of the low reverse brake LR/B, the speed change completion degree "Shift" starts its rising at the time "t3" (see FIG. 6).

Accordingly, also in case of the shifting from N-range to R-range wherein the reverse clutch R/C and the low reverse brake LR/B are both engaged, the starting of rising of the degree "Shift" can be regarded as the sign of the starting of the actual engaging operation of the friction element (viz., low reverse brake LR/B) that would take place after completion of the piston stroke.

In the time chart of FIG. 6, denoted by the dashed line is a line for showing the speed change completion degree "Shift" that is effected when, like in garaging, the shift lever is moved from R-range to D-range and then to R-range repeating forward and reverse movement of the vehicle.

In this case, the transmission is forced to assume the reverse gear or forward first gear, and thus, the speed change completion degree "Shift" indicates 100%. Thus, upon release of the engaged condition of one friction element, the degree "Shift" lowers and, at the time "t3" when another friction element starts its actual engaging operation following completion of the piston stroke, the degree "Shift" starts to rise. Thus, also in this case, the starting of rising of the degree "Shift" can be regarded as the side for estimating the completion of the piston stroke of the latter friction element.

In the above-mentioned embodiment, the description is directed to transmissions of a type wherein hydraulic pressures for the friction elements are directly controlled by respective solenoids and wherein a so-called select speed change is carried out. However, the present invention is not limited to such type. That is, the present invention is applicable to other types of transmissions under the substantially same concept of the invention.

The entire contents of Japanese Patent Application 2000-282337 (filed Sep. 18, 2000) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. In an automatic transmission driven by an engine through a torque converter, said transmission including a plurality of friction elements which are selectively engaged to provide a selected gear thereby to transmit a power of engine to an output shaft of the transmission while changing the rotation speed,
   a speed change completion degree estimating system comprising:
      a first section that derives a first difference between an actual input rotation speed of the transmission and an engine rotation speed;
      a second section that derives a second difference between a target input rotation speed of the transmission provided after completion of the speed change operation and said engine rotation speed; and
      a third section that calculates a speed change completion degree of the transmission by using a ratio between the first difference and the second difference.

2. A speed change completion degree estimating system as claimed in claim 1, in which said target input rotation speed provided after completion of the speed change operation is derived by multiplying a gear ratio of the transmission provided upon completion of the gear changing operation and an output rotation speed of the transmission together.

3. A speed change completion degree estimating system as claimed in claim 1, in which said third section is configured to estimate that the progress of the speed change operation is high as the speed change completion degree increases.

4. A speed change completion degree estimating system as claimed in claim 3, in which said third section is configured to regard as a sign of the start of an actual engaging operation of a selected one of the friction elements following a piston stroke of the same when the speed change completion degree starts to rise.

5. In an automatic transmission driven by an engine through a torque converter, said transmission including a plurality of friction elements which are selectively engaged to provide a selected gear thereby to transmit a power of engine to an output shaft of the transmission while changing the rotation speed,
   a method for estimating a speed change completion degree of the transmission, comprising:
      deriving a first difference between an actual input rotation speed of the transmission and an engine rotation speed;
      deriving a second difference between a target input rotation speed of the transmission provided after completion of the speed change operation and said engine rotation speed; and
      calculating a speed change completion degree of the transmission by using a ratio between the first difference and the second difference.

6. In an automatic transmission driven by an engine through a torque converter, said transmission including a plurality of friction elements which are selectively engaged to provide a selected gear thereby to transmit a power of the engine to an output shaft of the transmission while changing the rotation speed,
   a speed change control device comprising:
      a first section that derives a first difference between an actual input rotation speed of the transmission and an engine rotation speed;
      a second section that derives a second difference between a target input rotation speed of the transmission provided after completion of the speed change operation and said engine rotation speed;
      a third section that calculates a speed change completion degree (Shift) of the transmission by using a ratio between the first difference and the second difference;
      a fourth section that, upon shifting of a shift lever of the transmission from a non-drive range to a drive range, estimates a time when an actual engaging operation of selected one of the friction elements starts, with reference to said speed change completion degree; and
      a fifth section that, before said time, controls a hydraulic pressure of the selected friction element to carry out the engaging operation thereof in a first given manner and after said time, controls said hydraulic pressure to carry out the engaging operation thereof in a second given manner.

7. A speed change control device as claimed in claim 6, in which said fifth section controls said hydraulic pressure to carry out a piston stroke of the selected friction element in the first given manner and controls said hydraulic pressure to carry out an actual engaging operation of the selected friction element in the second given manner.

8. In an automatic transmission driven by an engine through a torque converter, said transmission including a plurality of friction elements which are selectively engaged to provide a selected gear thereby to transmit a power of the engine to an output shaft of the transmission while changing the rotation speed, a method for controlling said transmission, comprising:

deriving a first difference between an actual input rotation speed of the transmission and an engine rotation speed;

deriving a second difference between a target input rotation speed of the transmission provided after completion of the speed change operation and said engine rotation speed;

calculating a speed change completion degree of the transmission by using a ratio between the first difference and the second difference;

estimating, upon shifting of a shift lever of the transmission from a non-drive range to a drive range, a time when an actual engaging operation of selected one of the friction elements starts, with reference to said speed change completion degree; and controlling, before said time, a hydraulic pressure of the selected friction element to carry out the engaging operation thereof in a first given manner and controlling, after said time, said hydraulic pressure to carry out said engaging operation in a second given manner.

* * * * *